A. F. MASURY & A. G. HERRESHOFF.
FOUR-SPEED TRANSMISSION.
APPLICATION FILED JUNE 5, 1917.
1,241,415.
Patented Sept. 25, 1917.
2 SHEETS—SHEET 2.
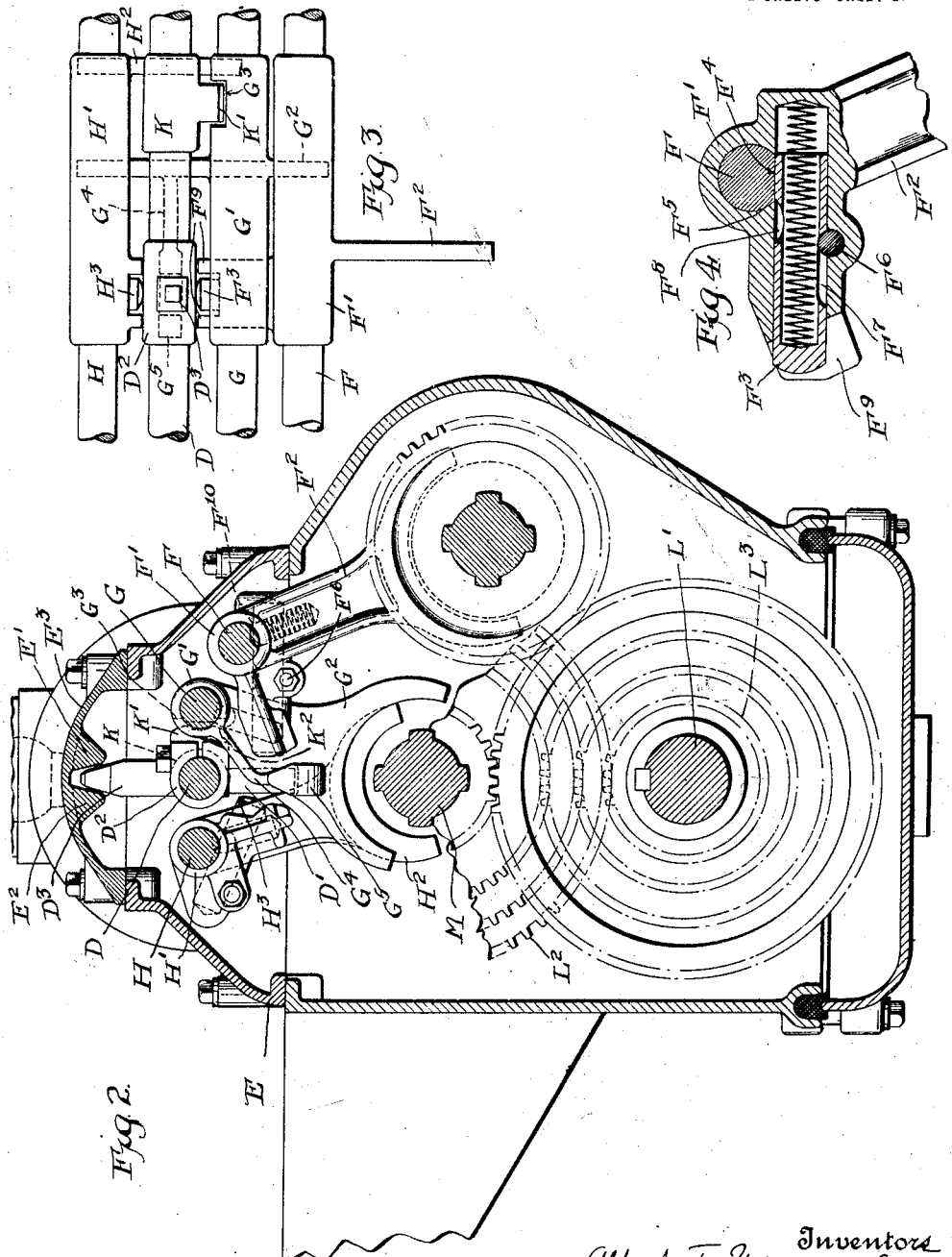

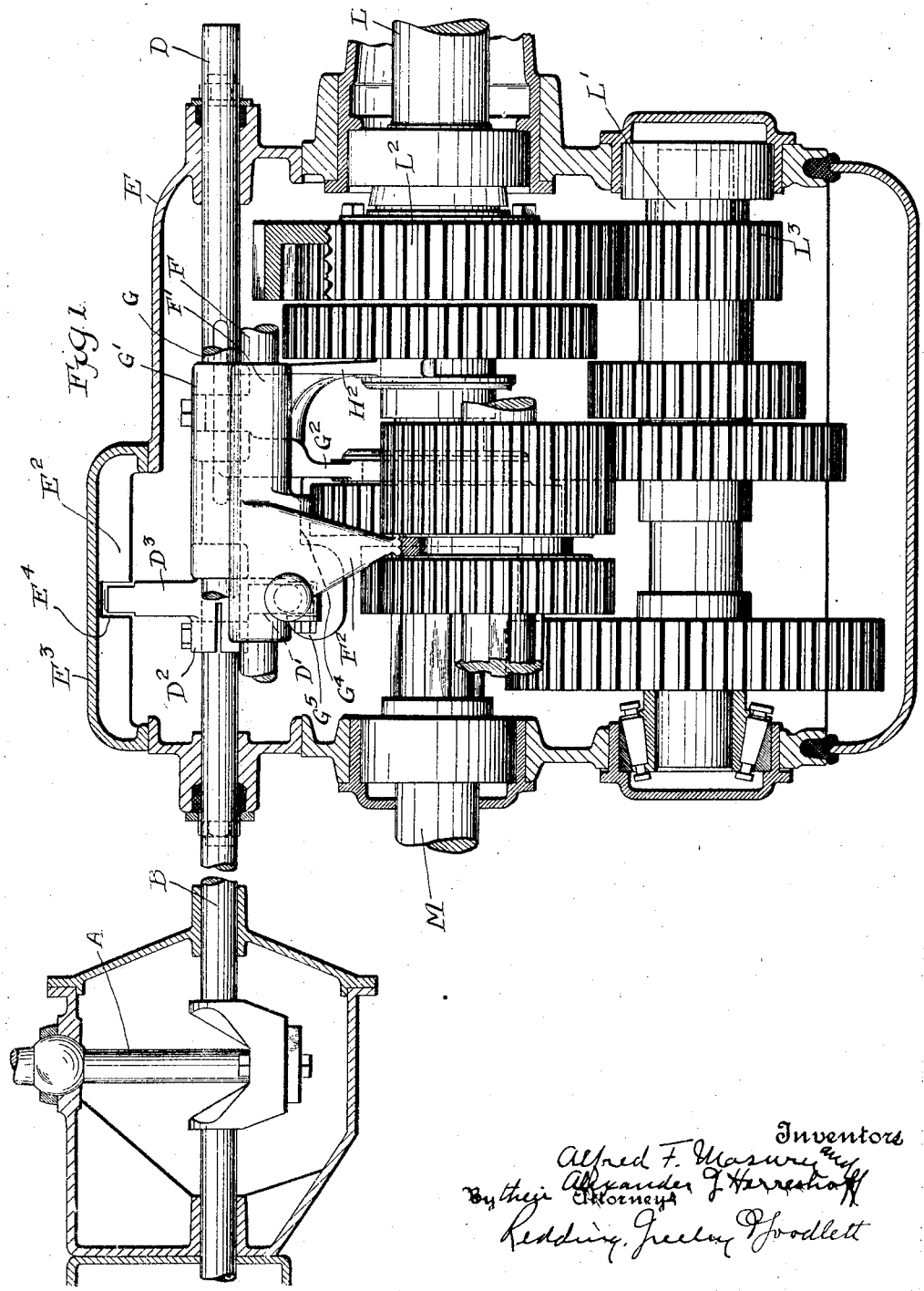

UNITED STATES PATENT OFFICE.

ALFRED F. MASURY AND ALEXANDER GRISWOLD HERRESHOFF, OF NEW YORK, N. Y., ASSIGNORS TO INTERNATIONAL MOTOR COMPANY, OF NEW YORK, N. Y., A CORPORATION OF DELAWARE.

FOUR-SPEED TRANSMISSION.

1,241,415.   Specification of Letters Patent.   Patented Sept. 25, 1917.

Application filed June 5, 1917. Serial No. 172,857.

*To all whom it may concern:*

Be it known that we, ALFRED F. MASURY and ALEXANDER GRISWOLD HERRESHOFF, citizens of the United States, and residents of the borough of Manhattan of the city of New York, in the State of New York, have invented certain new and useful Improvements in Four-Speed Transmission, of which the following is a specification, reference being had to the accompanying drawings, forming a part hereof.

This invention relates generally to gear shifting mechanism particularly adapted for automobile use, of the general type described and claimed in U. S. Letters Patent to Alfred F. Masury No. 1,147,877 dated July 27, 1915, but the improvements herein described have to do primarily with the provision of mechanism of such general character as adapted for transmission employing four speeds forward and reverse. While the aforesaid patent describes a simple and compact mechanism for insuring invariable shifting of the two forks necessary for obtaining three speeds forward and reverse, it will be appreciated that the addition of a shifting fork as is necessary where four speeds forward and reverse are employed, presents mechanical difficulties of importance. In the improved construction it is sought to maintain the simplicity, compactness and certainty of operation which characterizes the construction shown in the earlier patent and, in addition, provide locking devices for the several forks which shall maintain the forks in their idle positions when required and yet permit their release automatically when they are to be moved. A further object of the invention is to maintain in association with the shifting mechanism, a form of H-gate which will be effective in guiding the shifter member and indicating to the operator the positions of such shifter member. The improved details of construction will appear hereinafter in connection with the description of the accompanying drawings, which show one practical embodiment of the invention. In the drawings—

Figure 1 is a fragmentary view, partly in side elevation and partly in vertical section, of the gear box with sliding gears for four speeds and reverse.

Fig. 2 is a view in transverse section through the gear box shown in Fig. 1.

Fig. 3 is a diagrammatic view in plan showing the relation of the several supporting shafts for the shifter forks and shifter member.

Fig. 4 is a sectional view in detail of one of the improved locks for the shifter forks.

The selective shifting of the transmission gears for the four speeds forward and reverse will be effected manually, in much the manner shown in said earlier patent, through a shifting lever A which has a universal connection with a rock shaft B, which is operatively connected with a sliding rock shaft D extending through the upper portion of the transmission casing E and journaled in its end walls. By means of the shifting lever A it will be understood that the rock shaft D may be rocked on its axis into any one of three angular positions, as will later appear, and may be moved axially in either direction when in any one of these three angular positions. As shown in Fig. 2, the rock shaft D has secured thereon a depending finger $D'$ cast on a collar $D^2$, this depending finger being intended to engage operatively with any one of the three shifter forks to be described. This collar $D^2$ also has cast therewith an upwardly extending finger $D^3$ which coöperates with a modified H-gate formed by parallel spaced ribs $E'$, $E^2$ cast on the inner face of the removable cap $E^3$ for the transmission housing. These ribs $E'$, $E^2$ are provided with transverse slots $E^4$ through which the finger $D^3$ may be moved laterally to permit rocking of the rock shaft D. When the finger $D^3$ is in a vertical position it may be slid along the groove formed by the spaced ribs $E'$, $E^2$ when the rock shaft D is slid axially. When the finger $D^3$ is moved through the slots $E^4$ until it falls outside of either one of the ribs $E'$, $E^2$, it may be slid along the outer faces of such ribs when the rock shaft D is slid. This explains the several positions to be taken by the rock shaft under the actuation of the shifting lever A.

At the upper portion of the casing E in juxtaposition to the rock shaft D and parallel thereto are supported three shaft F, G, H, on which are slidably mounted respectively sleeves $F'$, $G'$, $H'$, carrying depending shifter forks F², for reverse, G² for first and second speeds, and H² for third and fourth speeds, respectively. As shown in Fig. 4, the fork F² is normally held against movement along its shaft F by means of a spring-pressed sliding bolt F³ which rests in a recess F⁴ cut in the shaft F and normally alined with a slot F⁵ in the fork. This bolt is limited in its outward movement against the action of the spring by means of a transverse pin F⁶ resting in a slot F⁷ in the wall of the bolt. In another portion of the bolt F³ is formed a curved recess F⁸ which, when the bolt is pressed inwardly, may be brought into alinement with the shaft F, thereby permitting the fork to be slid along the shaft. The outer end of the bolt F³ normally rests between guide flanges F⁹ in the fork, these guide flanges being spaced to receive the depending finger D' of the rock shaft D, the entrance of the finger between these flanges being accompanied by a recession of the bolt F³ to a point where its recess F⁸ alines with the shaft F and permits sliding of the fork. The lock H³ for the shifter fork H² for third and fourth speeds is like the lock just described. The lock for the fork G² to hold it against sliding movement when idle is necessarily of a different character and one of the important features of the invention has to do with means for locking this fork releasably on its shaft so that it will be unlocked only when the shifting member is in proper position for actuation of said fork. Referring to Fig. 2 it will be seen that the sleeve G' of the shifter fork G² has a slot in its side wall which may be alined with a slot cut in the side wall of the shaft G. The rock shaft D has feathered thereon a split sleeve K, the sides of which carry protruding beveled portions K', K², one or the other of which may be moved through a slot in the sleeve G' and into a recess G⁸ cut in the shaft G. These protrusions K', K² are of such form and dimensions as normally to lie wholly without the recess in the shaft G when the actuating finger D' is in vertical position, so that when the actuating finger is in such position it may be slid with the shaft D and the fork G². When the shaft D is rocked to an angular position, one or the other of the protrusions K', K² is thrown in the registering slot and recess G⁸ in the shaft G so as to lock the fork G² against movement. The shifter fork G² may be engaged operatively through a web G⁴ which extends from the face of the fork parallel with the rock shaft D and directly beneath such rock shaft and terminates in a channeled section G⁵ in which the actuating finger D' rests when it is in vertical position and through which it may pass freely when the shaft D is rocked.

Each one of the sleeves F', G', H', preferably carries a spring-pressed detent, such as is indicated at F¹⁰ in Fig. 2 as a ball, this ball being intended to seat in a pocket formed in the shaft F when the fork has assumed its normal position. By means of these spring-pressed detents in each one of the shafts the operator may be able to tell by feel just when the fork is in its intended position depending upon the desired combination of gears.

This invention is not concerned with the construction or relation of the gears by which the desired four speeds and reverse are derived, so it will not be helpful for an understanding of the improved parts of the shifting mechanism to go into these combinations. As shown in Fig. 1, it may be supposed that power is derived in the usual manner through a drive shaft L and is transmitted from the drive shaft to a counter shaft L' through coöperating gears L², L³, the power from the counter shaft L' being in turn returned to the propeller shaft M through any one of a number of selected gear combinations. Four different ratios of speed and reverse are permitted by the improved mechanism.

The operation of the shifting mechanism will bring out some of the important features thereof. When the rock shaft is so positioned angularly through the shifting lever A as to cause the finger D³ to assume a vertical position, the depending actuating finger D' will rest in the channel cast in the web G⁴ of the shifter fork G². In this position, the finger D³ is free to be slid along the groove formed by the spaced ribs E', E². In the illustrated embodiment of the invention, rocking of the shifting lever A in one direction will slide the shaft D axially and thereby bring about such a gear relation as to cause first speed. Rocking movement of the shifting lever A and axial movement of the shaft D in the opposite direction will directly bring about a gear combination which will give second speed. When the operator desires to go into third speed, the finger D³ is brought opposite the transverse slot E⁴ and the rock shaft D is moved angularly until the actuating finger D' passes into engagement with the locking bolt H³ of the shifter fork H² and releases this lock. At this time the finger D³ falls outside of the rib E' so that the rock shaft D may be slid axially. Such sliding movement of the rock shaft D causes corresponding sliding movement of the shifter fork H² along its shaft H since the actuating finger D' is in operative engagement with the fork. Such sliding movement in one direction will give a gear combination for third speed, while sliding movement in the opposite direction will give a gear combination for fourth speed. When the shaft D is rocked for actuation of this fork H² the upper protrusion K' on the feathered sleeve K will be moved into the recess G³ of the shaft G thereby locking this fork to its shaft G and holding it against accidental displacement. At this time the fork F² is locked to its shaft F by the bolt F³ in the manner hereinbefore described. When the actuating finger D' is returned to vertical position, it releases the spring bolt H³ so that this bolt automatically locks the fork H² to its shaft H. It is insured that this locking will occur since the finger D³ can only be returned to vertical position when it is brought opposite the slot E⁴ and when opposite the slot E⁴ the fork H² will be found in its normal position. If, in addition to the four forward speeds, reverse speed is desired, the rock shaft D is moved to its other extreme angular position in which the finger D³ lies outside of the rib E². The actuating finger D' then passes between the flanges F⁹ and engages the fork F² operatively. The bolt F³ is pressed in until its recess F⁸ is alined with the shaft F thereby unlocking the fork from its shaft. The protrusion K² is moved up into the recess G³ of the shaft G thereby locking the shifter fork G² against sliding movement. Axial movement of the shaft D will cause sliding movement of the fork F² with the gears which it engages and the resulting combination will give reverse speed. To repeat the operations described, it is evident that the forks must always be returned to their normal positions before the shaft D can be rocked since the finger D³ controls the positions of these forks in the sense that it permits rocking of the shaft D only when it is alined with the transverse slots E⁴.

The details in construction, form and arrangement may be changed without departing from the spirit of the invention provided the shifting mechanism thereby derived includes the elements of the appended claims.

We claim as our invention:

1. The combination with sliding gears, of gear shifting mechanism comprising a slidable rock shaft, independent shafts, shifter forks slidably mounted on said last named shafts respectively and engaging the sliding gears respectively, devices carried on the rock shaft and adapted to be engaged with one or another of the shifter forks to connect the rock shaft operatively with one of the forks, means to operate the rock shaft and a lock on the rock shaft to hold one of said forks from movement when any one of the remaining forks is to be shifted.

2. The combination with sliding gears, of gear shifting mechanism comprising a slidable rock shaft, independent shafts, shifter forks slidably mounted on said last named shafts respectively and engaging the sliding gears respectively, devices carried on the rock shaft and adapted to be engaged with one or another of the shifter forks to connect the rock shaft operatively with one of the forks, means to operate the rock shaft, and a sleeve feathered on the rock shaft and provided with means to engage one of said forks and lock it to its shaft when any one of the remaining forks is being shifted.

3. The combination with sliding gears and the casing therefor, of gear shifting mechanism comprising a slidable rock shaft journaled in said casing, independent shafts mounted in the end walls of the casing and extending parallel with the rock shaft and disposed respectively on opposite sides thereof, shifter forks slidably mounted on said last named shafts respectively and engaging the sliding gears respectively, a finger fixed on the rock shaft, ears carried on the shifter forks and adapted to be engaged by the finger when the rock shaft is oscillated, locking devices carried by certain of the shifter forks to hold such forks against sliding movement, said devices being released automatically by movement of the finger into operative relation with said ears, means to operate the rock shaft, and a separate lock for one of the shifter forks on the rock shaft, the operative relation of which to its fork is determined by the angular position of the rock shaft.

4. The combination with sliding gears and the casing therefor, of gear shifting mechanism comprising a slidable rock shaft journaled in said casing, independent shafts mounted in the end walls of the casing and extending parallel with the rock shaft and disposed respectively on opposite sides thereof, shifter forks slidably mounted on said last named shafts respectively and engaging the sliding gears respectively, locking devices carried by certain of the shifter forks to hold such forks against sliding movement, said devices being released automatically when the respective forks are engaged operatively with the rock shaft, and a sleeve feathered on the rock shaft and provided with means to engage one of the said forks and lock it to its shaft when any one of the remaining forks is being shifted, the operative relation of the locking means on the sleeve to its fork being determined by the angular position of the rock shaft.

5. The combination with sliding gears, of gear shifting mechanism for four speeds forward and reverse, comprising a slidable rock shaft, independent shafts, three shifter forks slidably mounted on said last named shafts respectively and engaging the sliding gears respectively, devices carried on the rock shaft and adapted to be engaged with one or another of the shifter forks to connect the rock shaft operatively with one of the forks, said rock shaft being movable into three angular positions to engage operatively one of said forks in each such position and means to operate the rock shaft.

6. The combination with sliding gears, of gear shifting mechanism for four speeds forward and reverse, comprising a slidable rock shaft, independent shafts, three shifter forks slidably mounted on said last named shafts respectively and engaging the sliding gears respectively, devices carried on the rock shaft and adapted to be engaged with one or another of the shifter forks to connect the rock shaft operatively with one of the forks, said rock shaft being movable into three angular positions to engage operatively one of said forks in each such position, means to operate the rock shaft, and locking devices for said shifter forks to hold the forks against sliding movement, each locking device being released automatically when the rock shaft is connected operatively with its shifter fork.

7. The combination with sliding gears, of gear shifting mechanism for four speeds forward and reverse, comprising a slidable rock shaft, independent shafts, three shifter forks slidably mounted on said last named shafts respectively and engaging the sliding gears respectively, devices carried on the rock shaft and adapted to be engaged with one or another of the shifter forks to connect the rock shaft operatively with one of the forks, said rock shaft being movable into three angular positions to engage operatively one of said forks in each such position, means to operate the rock shaft, a finger fixed on the rock shaft, ears carried on the shifter forks and adapted to be engaged by the finger when the rock shaft is oscillated, locking devices carried by certain of the shifter forks to hold such forks against sliding movement, such devices being released automatically by movement of the finger into operative relation with said ears and a separate lock for one of the shifter forks on the rock shaft, the operative relation of which to its fork is determined by the angular position of the rock shaft.

8. In gear shifting mechanism, a slidable rock shaft adapted to be engaged operatively with said gears and movable into three angular positions for operative engagement with gears for different combinations, a finger carried on the rock shaft and spaced ribs with which the finger coöperates to guide the rock shaft in its sliding movement in each one of its three angular positions, said ribs being provided with a transverse slot therethrough for movement of the finger when the shaft is rocked.

9. The combination with sliding gears and the casing therefor, of gear shifting mechanism for four speeds forward and reverse, comprising a slidable rock shaft journaled in the casing and movable into three angular positions, independent shafts in the casing, three shifter forks slidably mounted on said last named shafts respectively and engaging the sliding gears respectively, devices carried on the rock shaft and adapted to be engaged with one or another of the shifter forks to connect the rock shaft operatively with one of the forks, two spaced ribs formed on the inner wall of the gear casing and provided with a transverse slot therethrough, means carried on the rock shaft and positioned in operative relation to said ribs, whereby sliding movement of the rock shaft in any one of its three angular positions is guided by coöperation of said last named means with said ribs, and means to operate the rock shaft.

This specification signed this 29th day of May A. D. 1917.

ALFRED F. MASURY.
ALEXANDER GRISWOLD HERRESHOFF.